May 31, 1949.  P. H. BIES ET AL  2,471,854
FIFTH WHEEL LOCK FOR TRAILERS
Filed Jan. 20, 1948
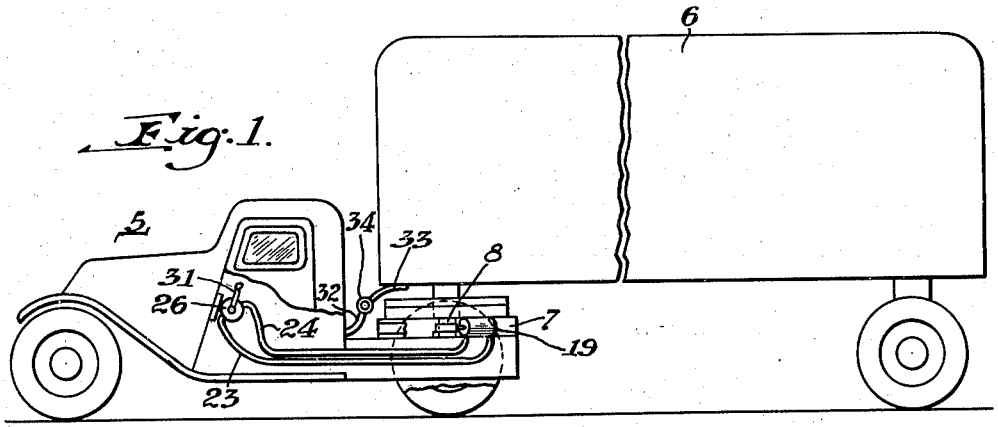
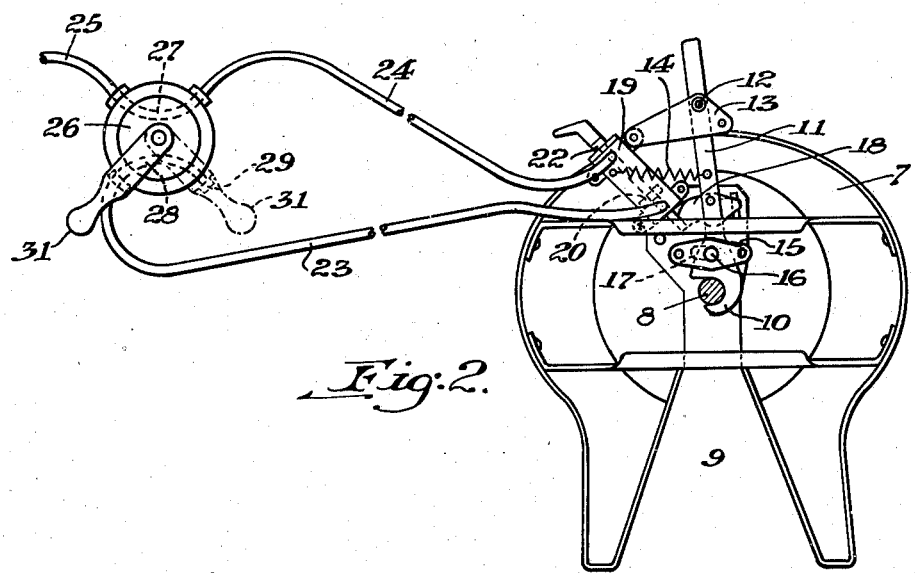
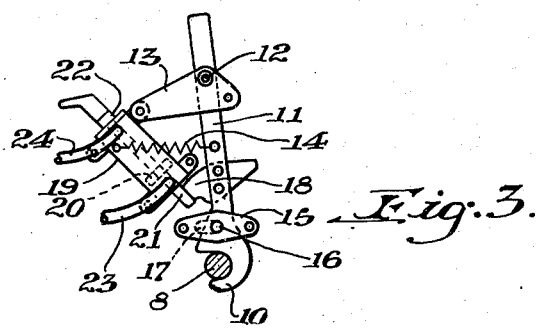
INVENTORS.
PETER H. BIES &
FINLEY MARVIN CRUTHERS.
BY Archworth Martin
their ATTORNEY Patented May 31, 1949

2,471,854

UNITED STATES PATENT OFFICE 2,471,854

FIFTH WHEEL LOCK FOR TRAILERS

Peter H. Bies and Finley Marvin Cruthers, McKeesport, Pa.

Application January 20, 1948, Serial No. 3,336

2 Claims. (Cl. 280—33.05)

Our invention relates to coupling apparatus of the fifth wheel type such as used for connecting tractor trucks to trailers, and particularly to a pneumatically-controlled device for latching and unlatching the retaining hook or hooks that hold the king pin of the trailer in connected relation to the fifth wheel of the tractor.

Our invention has for its object the provision of a fluid-operated latching and unlatching device that can readily be substituted for the usual manually-controlled latches on various standard types of couples and which can be controlled from the tractor cab.

The invention is primarily useful as a safety device in that it will permit the tractor driver to uncouple the tractor from the trailer and to escape with the tractor when there is danger of a wreck because of traveling downhill at a high speed and out of control, to thereby enable the driver to escape being crushed and perhaps also to avoid burning of the trailer and its contents, as frequently happens when a trailer crashes into its tractor.

As shown in the accompanying drawing, Figure 1 is a side view of a tractor and trailer in coupled relation, with our invention applied thereto; Fig. 2 is a plan view on an enlarged scale, showing the fifth wheel and certain of its associated parts in inverted position, and schematically showing also the pneumatically-controlled apparatus for operating the latch, and Fig. 3 is an inverted plan view showing a portion of the apparatus of Fig. 2.

A tractor of conventional form is indicated by the numeral 5 and a trailer by the numeral 6. The tractor is provided with the usual fifth wheel 7 for connection with the king pin 8 of the trailer. The fifth wheel will support the trailer in the usual manner and has a rearwardly flared opening 9 through which the king pin 8 will slide to the position shown at 9, where it is normally held by the hook portion 10 of a retaining lever 11.

The lever 11 is pivotally supported at 12 by a plate 13 that is connected to the fifth wheel and is yieldably held in latching position by a tension spring 14. Near its inner end, the lever extends loosely behind a strap 15 that is secured to the fifth wheel. The plate 15 carries a pin 16 that extends through a slot 17 in the lever to permit oscillation of the lever about its pivot 12. These parts are well known in the art and need not be described in further detail.

The lever 11 has secured thereto a stop member 18 that is adapted to make engagement with a latch member for holding the lever in coupled relation with the king pin. These latches are commonly manually operated and therefore cannot be released by the tractor driver, in emergencies encountered while the vehicle is traveling.

We make provision for separating the latch member from the cab, by the apparatus which will now be described. The apparatus comprises a cylinder 19 that contains a piston 20. The piston has a rod-like extension 21 projecting through the front end of the cylinder and serving as a latch bolt for the stop member 18, to hold the retaining lever in coupled relation to the king pin. The piston also has a rearwardly-extending rod or bar 22, through the rear end of the cylinder, whereby the latch bolt 21 can be manually operated when there is no fluid pressure in the cylinder.

Air lines 23 and 24 are connected to the front and rear ends of the cylinder 19 to effect reciprocating movements of the piston and the latch 21. The air supply for the lines 23—24 will be received through a pipe 25 from a suitable source of pressure such as the air brake system of the tractor. A valve 26 controls the flow of air to the ends of the cylinder 19 through ports 27 and 28. As shown in Fig. 2, the port 27 is in registry with the lines 25 and 24 so that air is supplied to the rear end of the cylinder and thus holding the latch bolt 21 in operative position with respect to the stop plate 18. At this time, the line 23 and the port 28 are in registry with an exhaust port 29 of the valve casing.

If now the driver desires to uncouple the tractor from the trailer, he will swing the valve-operating handle 31 from its full line position to its dotted line position, thus bringing the port 27 into registry with the pipes 25 and 23 and the port 28 into registry with the pipe 24 and the exhaust at 29. The piston 20 will then be forced backwardly, thus withdrawing the latch 21, so that upon speeding up of the tractor, the retaining lever 11 will be swung in a counterclockwise direction, to uncoupled position, through pull of the king pin on the inner face of the hook 10 and against the tension of the spring 14.

If this uncoupling is done in an emergency as when the tractor and the trailer are out of control going down a mountain grade, the speeding up of the tractor will pull it away from the trailer allowing it to escape the danger of being crushed by the trailer at the foot of the hill, and also avoiding the fire hazard that is incident to such a wreck. Even if the trailer becomes overturned, the tractor and the driver are likely to escape injury and perhaps even the goods themselves are not damaged, depending upon the nature of the cargo.

However, damage to the trailer and its cargo through wrecking thereof is less likely to occur, where there is an air-brake line extending from the tractor to the rear wheels of the trailer. These lines include an air hose 32 on the tractor, an air hose 33 on the trailer, and a coupling 34 for these hoses. Usually these couplings are of such form that they will automatically pull apart under strong tensional stresses, and the brakes on the trailer become thereby automatically applied. Even if the coupling 34 does not automatically separate upon disconnection of the tractor from the trailer, the hose would be torn apart and the brakes, nevertheless, automatically applied on the trailer, as frequently happens in connection with the air brake lines of railroad cars.

The tractor and trailer can be coupled together in the usual manner simply by backing the tractor and its fifth wheel into position where the king bolt 8 will snap behind the hook 10. Thereupon, if the driver is in his cab, he can swing the valve handle 31 to its full line position in Fig. 2, thus causing the latch bolt 21 to be projected into position to hold the lever 11 in its coupled position. When the handle 31 is at its intermediate position, the supply of air to either the line 23 or the line 24 is cut off.

We claim as our invention:

1. Apparatus for latching and unlatching a retaining hook that is movable on the fifth wheel of a tractor truck to engage and disengage the king pin of a trailer, comprising a cylinder adapted for connection to a lower portion of the fifth wheel, a piston in the cylinder, rod-like elements carried by the piston and projecting through the ends of the cylinder, the element that projects from the forward end of the cylinder serving as a latch bolt to hold the retaining hook in coupled relation to the king pin, when the piston is in its forward position in the cylinder, and the element that projects from the rear end of the cylinder serving as a pull rod that can be manually drawn back to retract the piston and the latch bolt, for release of the retaining hook and means manually operable from the tractor, to admit fluid pressure to the front and rear ends of the cylinder, selectively.

2. Coupling apparatus for connecting a trailer to the fifth wheel of a tractor truck, comprising a pivotally-mounted lever having a retaining hook for engagement with a connecting member on the trailer, when the forward end of the trailer is supported on the fifth wheel, the lever and hook being so positioned relative to the pivot and said connecting member, that a pulling force will swing the hook to inoperative position when it is not latched, a stop shoulder carried by the said lever, a cylinder and piston mounted on the fifth wheel, a latch movable with the piston into an advanced position where it will engage the stop shoulder and thereby hold the lever and hook in coupled relation with said connecting member, at one end of the piston stroke, and means manually operable from the tractor to admit fluid pressure to the forward end of the cylinder, for thereby retracting the piston and the latch and releasing the stop shoulder.

PETER H. BIES.
FINLEY MARVIN CRUTHERS.

REFERENCES CITED

The following references are of record in the file of this patent:

UNITED STATES PATENTS

| Number | Name | Date |
| --- | --- | --- |
| 2,263,114 | Winn | Nov. 18, 1941 |
| 2,372,943 | Fontain et al. | Apr. 3, 1945 |